United States Patent [19]
Quiogue

[11] 4,325,111
[45] Apr. 13, 1982

[54] SWITCHED MODE REGULATED DC TO DC CONVERTER

[75] Inventor: Virgilio Quiogue, Northville, Mich.

[73] Assignee: Burroughs Corporation, Detroit, Mich.

[21] Appl. No.: 136,744

[22] Filed: Apr. 2, 1980

[51] Int. Cl.³ ........................................... H02M 3/335
[52] U.S. Cl. ...................................... 363/17; 323/289
[58] Field of Search .................. 323/288, 289; 363/17, 363/25, 26, 132

[56] References Cited

U.S. PATENT DOCUMENTS

| | | | |
|---|---|---|---|
| 3,863,131 | 1/1975 | Muir | 363/25 |
| 4,017,784 | 4/1977 | Simmons et al. | 363/17 |
| 4,063,306 | 12/1977 | Perkins et al. | 363/17 |
| 4,071,812 | 1/1978 | Walker | 363/17 X |
| 4,213,082 | 7/1980 | Wisner et al. | 363/17 X |

*Primary Examiner*—A. D. Pellinen
*Attorney, Agent, or Firm*—Charles E. Quarton; Kenneth J. Cooper; Kevin R. Peterson

[57] ABSTRACT

A switched mode regulated DC to DC converter for supplying a regulated voltage to a load includes a switching frequency generator of a switching cycle having positive and negative portions. A device, responsive to the outputs of the switching frequency generator, accumulates a voltage during the positive and negative portions of the switching cycle. The demand for voltage by a load is sensed and circuitry generates a first and second trigger otuput during the respective positive and negative portion of the switching cycle when the accumulated voltage equals the sensed load voltage demand, the time required to generate the second trigger output being equal to the time required to generate the first trigger output. A transformer apparatus, responsive to the first and second generated trigger outputs, generates currents of positive and negative polarity during the positive and negative portions of the switching cycle. A first electronic switch, responsive to the generated currents of positive polarity, connects a load voltage source to a load during the positive portion of the switching cycle. Similarly, a second electronic switch, responsive to the generated currents of positive polarity, connects the load voltage source to the load during the negative portion of the switching cycle.

1 Claim, 11 Drawing Figures

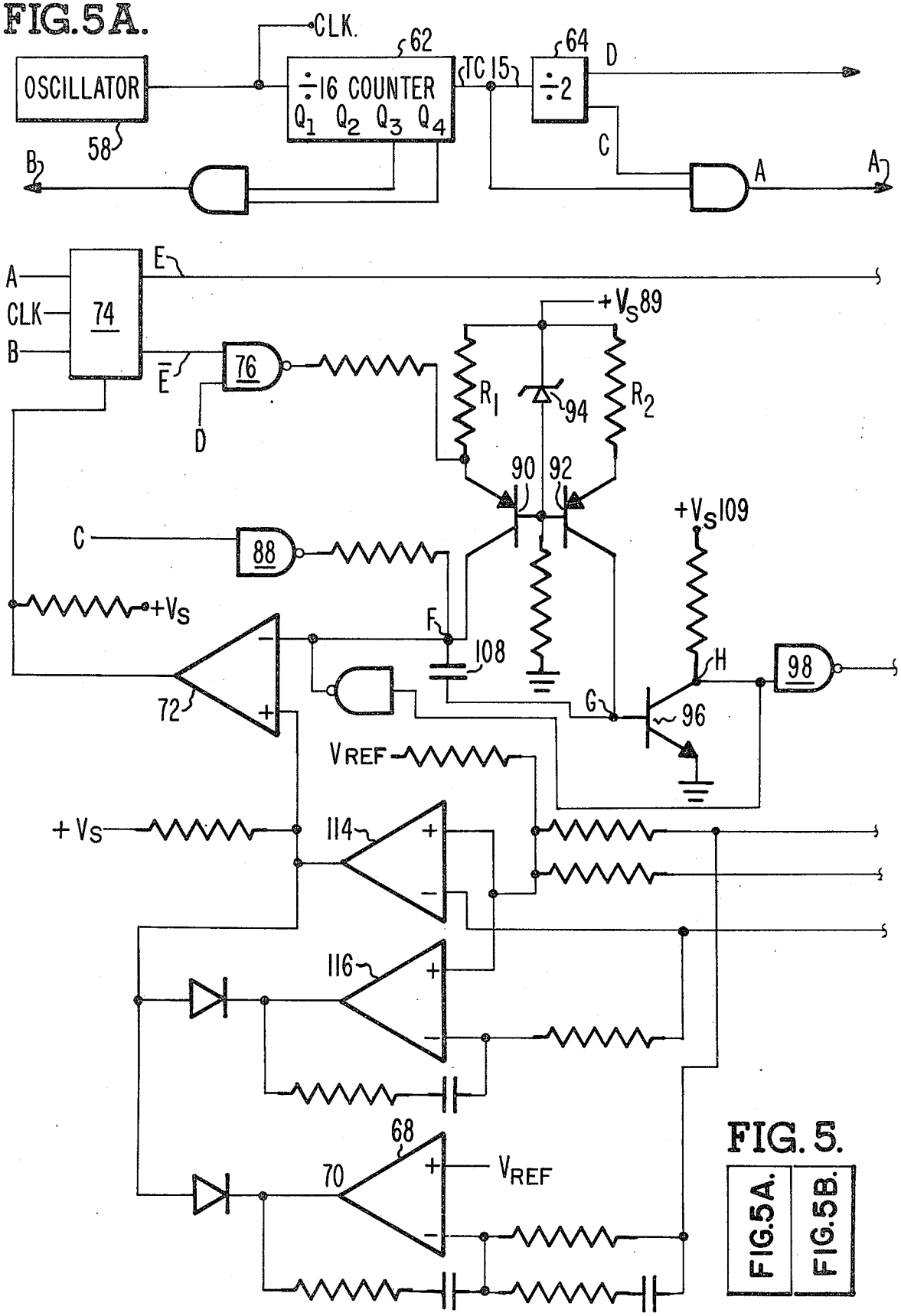

SWITCHED MODE REGULATED DC TO DC CONVERTER

BACKGROUND OF THE INVENTION

1. Field of the Invention

This invention relates to a switched mode regulated DC to DC converter for maintaining a predetermined supply voltage in response to a varying DC power source and circuit loads.

2. History of the Prior Art

Regulated DC to DC converters achieve their objective of delivering a predetermined DC voltage in response to a changing DC voltage source and loads by various approaches. Some first route an AC input voltage through a transformer to obtain an AC voltage close to the desired DC voltage. Next, that AC voltage is rectified and filtered so the resulting DC voltage can be processed through circuitry for maintaining the desired supply voltage. An alternative is to first rectify and filter the AC input voltage and feed the large value of DC voltage through the circuitry designed to obtain the required supply voltage.

Once a DC supply voltage is obtained, simple voltage regulators will feed this DC voltage to a power transistor to furnish the current to the driven load. Regulation of the load voltage occurs by comparing the voltage delivered to the load with the reference voltage. As the DC supply levels vary due to fluctuations in the available AC source and the load requirements, the transistor will receive compensating voltage levels to maintain a constant value of load voltage. Consequently, when the DC supply varies to increase the load voltage, the comparator circuit will decrease the voltage to the power transistor to decrease the voltage delivered to the load to the regulated voltage value. Likewise, decreases in DC supply levels, when sensed, increase voltage values sent to the transistor which cause the supply to deliver more current to the load to maintain the regulated voltage.

The problem with the described regulator is its poor efficiency. The DC voltage source or the control circuitry must necessarily be greater than the output or load voltage since fluctuations in the AC supply as well as the current demands of varying loads must be accommodated. Also, the circuitry in prior systems used their power transistors in the linear range of operation rather than at the saturation points. Consequently, the power lost at the transistor was equal to the voltage across the partially on transistor multiplied by the current through the device.

The applicant's invention embodies circuitry relating to a switched mode regulated DC to DC converter. By designing circuitry to operate transistors in a completely on and off condition with a minimum of time consumed during switching, wasted power is minimized. In addition, the proper cooperation of the switching circuitry and voltage source elements provides equal durations of voltage during the switching cycle to finish a constant voltage to a load.

SUMMARY OF THE INVENTION

A switched mode regulated DC to DC converter for supplying a regulated voltage to a load incorporates a switching frequency generator of a switching cycle having positive and negative portions. A capacitor, responsive to the outputs of the switching frequency generator, accumulates a voltage during the positive and negative portions of the switching cycle.

A voltage source, a pair of matched transistors, a third transistor, electronic logic circuits, an operational amplifier, comparator, and load voltage sensor are next combined with the capacitor to generate trigger outputs. A first trigger output is generated during the positive portion of the switching cycle when the voltage on the capacitor equals the sensed load voltage. The pair of matched transistors, biased by the voltage source, feed current to the capacitor during the positive and negative portions of the switching cycle. The third transistor responds to outputs from the matched transistors to direct current from the capacitor to ground during the positive portion of the switching cycle. Conversely, during the negative portion of the switching cycle, the third transistor directs current to the capacitor.

In a similar manner, electronic logic circuits, responsive to the switching frequency generator, direct current to the capacitor during the positive portion of the switching cycle and direct the current from the capacitor to ground during the negative portion of the switching cycle. Then a comparator compares the voltage stored on the capacitor to the sensed load voltage demand as transmitted by the operational amplifier. When these voltages are equal, a trigger output is generated to transformers which generate currents of positive and negative polarity during the positive and negative portions of the switching cycle.

From the transformers, currents of positive polarity are used to connect a load voltage source to a load. A first transistor has its base and emitter bridged by a diode so that only currents of negative polarity will be conducted through the first transistor. However, a second transistor will conduct the currents of positive polarity so the load voltage source will be connected to the load during the positive portion of the switching cycle. Likewise, an additional first transistor, diode and second transistor, responsive to currents from a second transformer, connect the load voltage source to a load during the negative portion to the switching cycle.

BRIEF DESCRIPTION OF THE DRAWINGS

FIGS. 5A and 5B depict a general circuit diagram of the regulated DC to DC converter;

DETAILED DESCRIPTION

Figure 1:
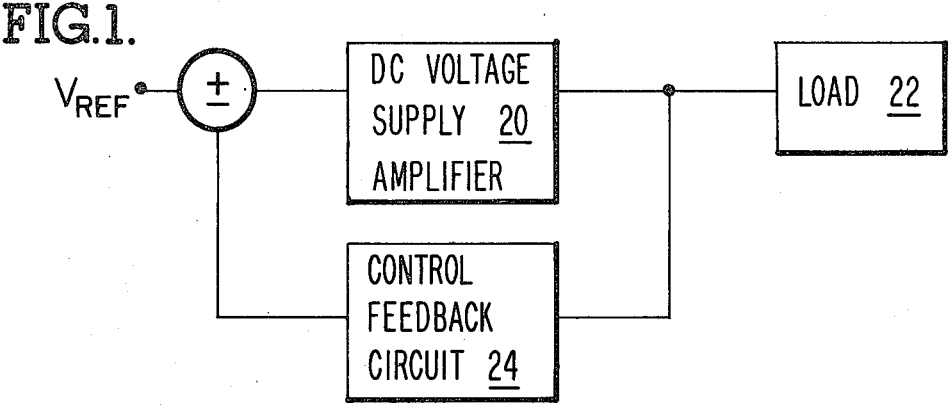
FIG. 1 is a simplified block diagram of a regulated DC to DC converter.

The essence of a regulated DC to DC converter is its ability to output a desired voltage, sense changing current demands by a load, and adjust the delivered current while maintaining the desired voltage. As depicted in FIG. 1, a DC voltage supply amplifier 20 delivers an output voltage to a load 22. This voltage is sensed by a control feedback circuit 24 and compared to the reference voltage which the DC voltage supply 20 was intended to deliver. If the sensed output voltage varies from the reference, the control feedback circuit 24 will appropriately regulate the DC voltage supply amplifier 20 to reestablish the desired equality.

Figure 2:
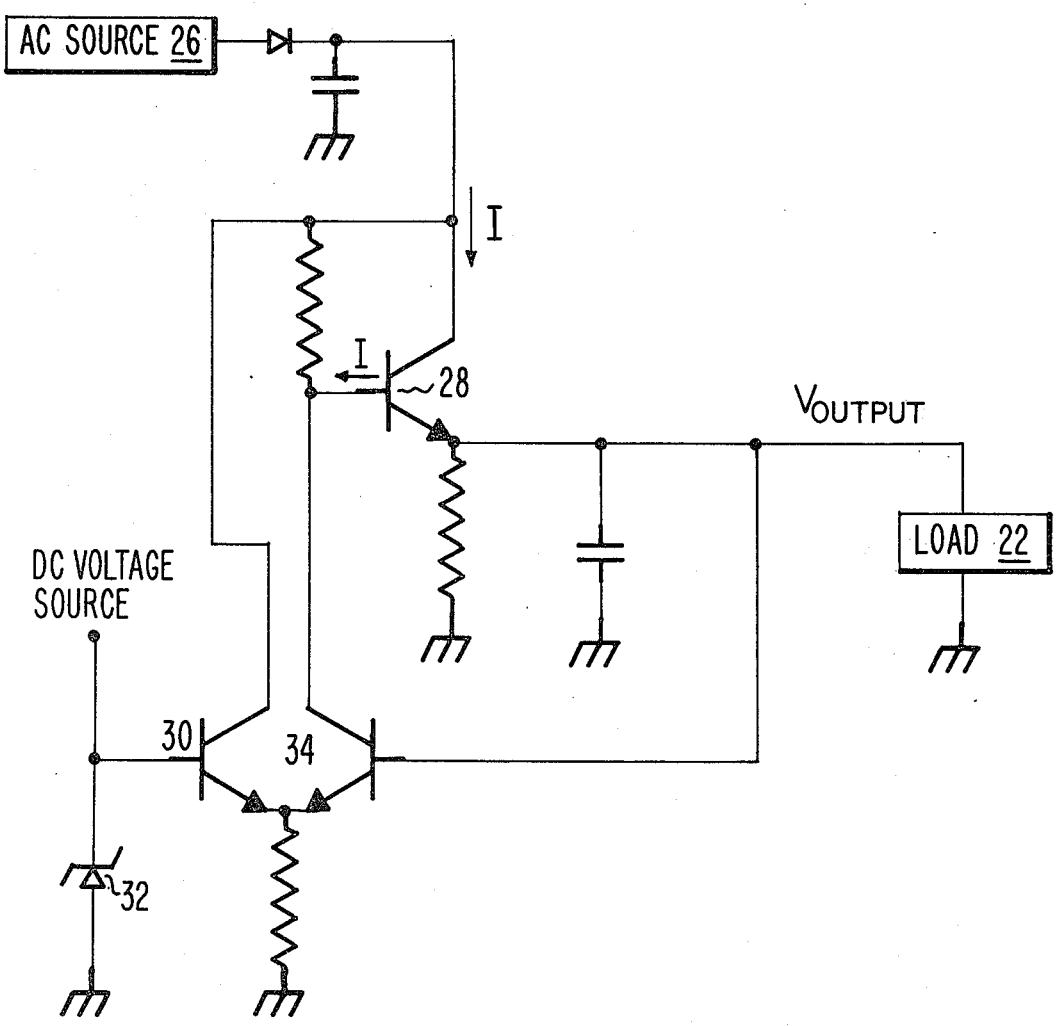
FIG. 2 is a circuit diagram of a simplified regulated DC to DC converter.

A simplified version of a regulated DC to DC converter appears in FIG. 2. The AC voltage source 26 represents a standard 115 AC voltage and includes either a step-down transformer to furnish a lower level AC voltage for rectification or a circuit to immediately rectify the 115 volts AC to deliver the needed level of DC voltage for the converter. This DC voltage source is then fed through an amplifier 28 to furnish the voltage requirements of load 22.

To set a voltage level at which the converter will be regulated, a DC voltage reference 30 may be established by routing the DC voltage source through a resistor and a zener diode 32 having a desired output voltage characteristic. At comparator 34, the DC reference voltage 30 is compared to the output voltage. When the output level drops below the DC reference 30, more current is drawn through the base of amplifier 28 so that more current and voltage is delivered to the load 22. Conversely, when the output voltage exceeds the DC reference 30, less current is drawn from the amplifier's base to decrease the voltage delivered to the load. Therefore, amplifier 28 is made to operate along its linear range to vary the amount of delivered voltage. Unfortunately, since the amplifier's power consumption is equal to the voltage drop across the amplifier multiplied by the current amplifier, the depicted regulated converter sacrifices efficiency for simplicity.

If amplifier 28 could be switched completely on to its saturation point to supply the load 22 with voltage, the amplifier would consume an extremely small amount of power since the voltage drop across the device would be nearly zero. This would result when a current limiting element such as an inductor is connected in series with amplifier 28. Likewise, the power consumption would approach zero if the amplifier could be switched completely off when no voltage is required by the load. Under these off conditions, the voltage drop across the amplifier 28 is equal to the DC supply voltage minus the output voltage, but the current to the amplifier would be approximately zero.

Figure 3:
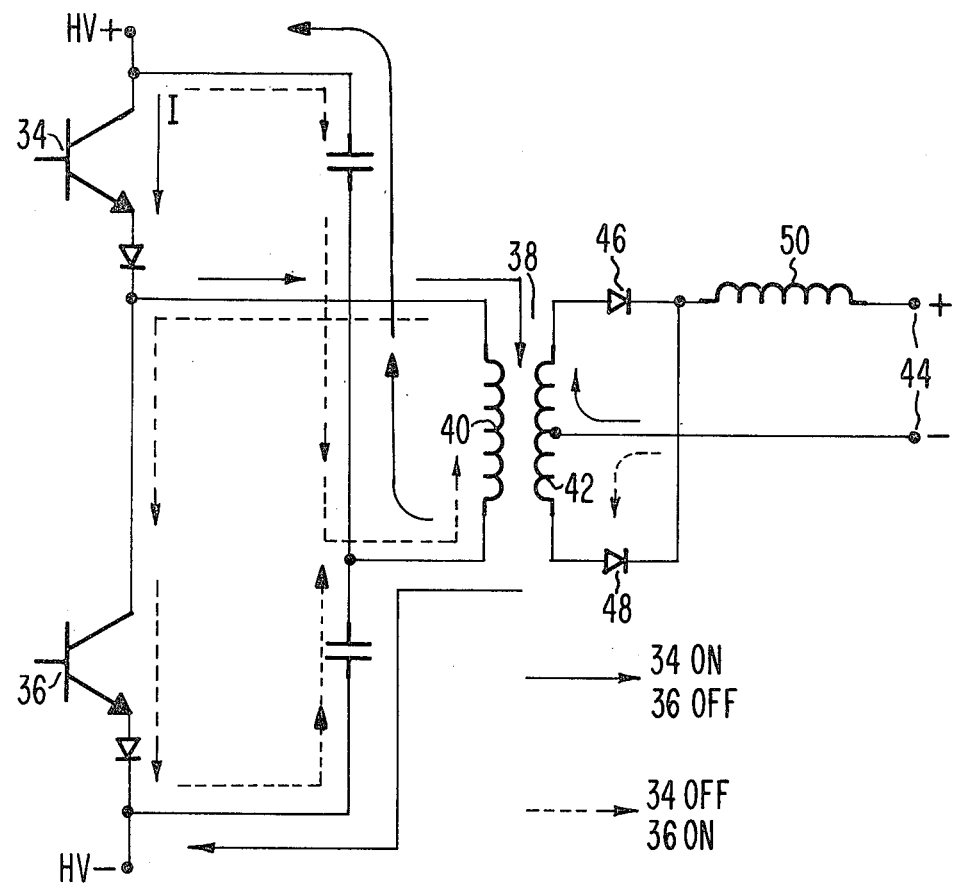
FIG. 3 depicts the current paths during transistor switching.

To embody the concept of an efficiently switching, regulated DC to DC converter, the applicant chose to directly rectify the standard 115 AC voltage for use as the positive and negative high voltage DC shown in FIG. 3.

Next, two transistors were included for switching. During the positive portion of the switching cycle, positive transistor 34 would be completely turned on (thereby having a nearly zero voltage drop) while negative transistor 36 would be completely turned off (thereby drawing nearly zero current) by switching circuitry (FIG. 5A) for a specified time to permit a predetermined amount of current to flow through transformer 38 (FIG. 3) in the direction indicated by the solid line. By an appropriate ratio of primary 40 and secondary 42 coil turns, the desired amount of DC voltage for the load will be available at the output 44. Likewise, during the negative cycle, negative transistor 36 will be switched on while positive transistor 34 will be off to allow the current to flow through the primary coil 40 of transformer 38 in the direction indicated by dashed lines. The configuration of secondary coil 42, positive and negative diodes 46 and 48 respectively, and inductor 50 permit a single DC voltage polarity to exist at the output 44. Inductor 50 will maintain the induced DC voltage level during the rapid switching between the positive and negative portions of the switching cycle.

Figure 4:
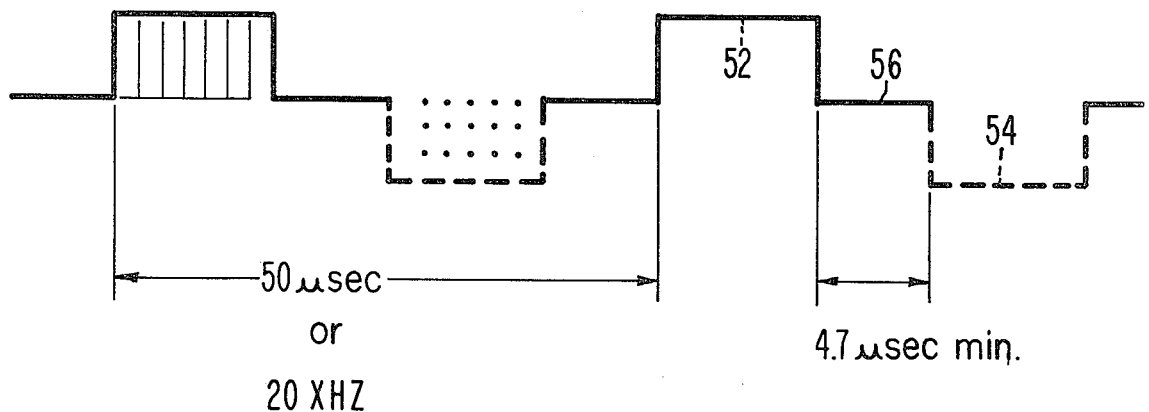
FIG. 4 depicts the variable pulse width wave form used to regulate the converter.

As depicted in FIG. 4, the duration of the positive and negative portions of the switching cycle, 52 and 54 respectively, may be increased and decreased within the established regulation limit to vary the amounts of voltage deliverable in response to load demands. Shorter durations of the switching cycle portions result in less voltage at output 44. Also, a delay period 56 of approximately 4.7 microseconds, separating the positive and negative portions of the switching cycle, is incorporated in the switching circuitry (FIG. 5A) to prevent the possibility of having both positive and negative transistors (34 and 36 respectively) switched on simultaneously. This condition would be potentially damaging to the transistors since a short circuit would exist between the high positive and negative DC voltage supplies. The short circuit would draw an excessive amount of damaging current through the transistors 34 and 36.

SWITCHING CONTROL CIRCUITRY

Figure 5B:
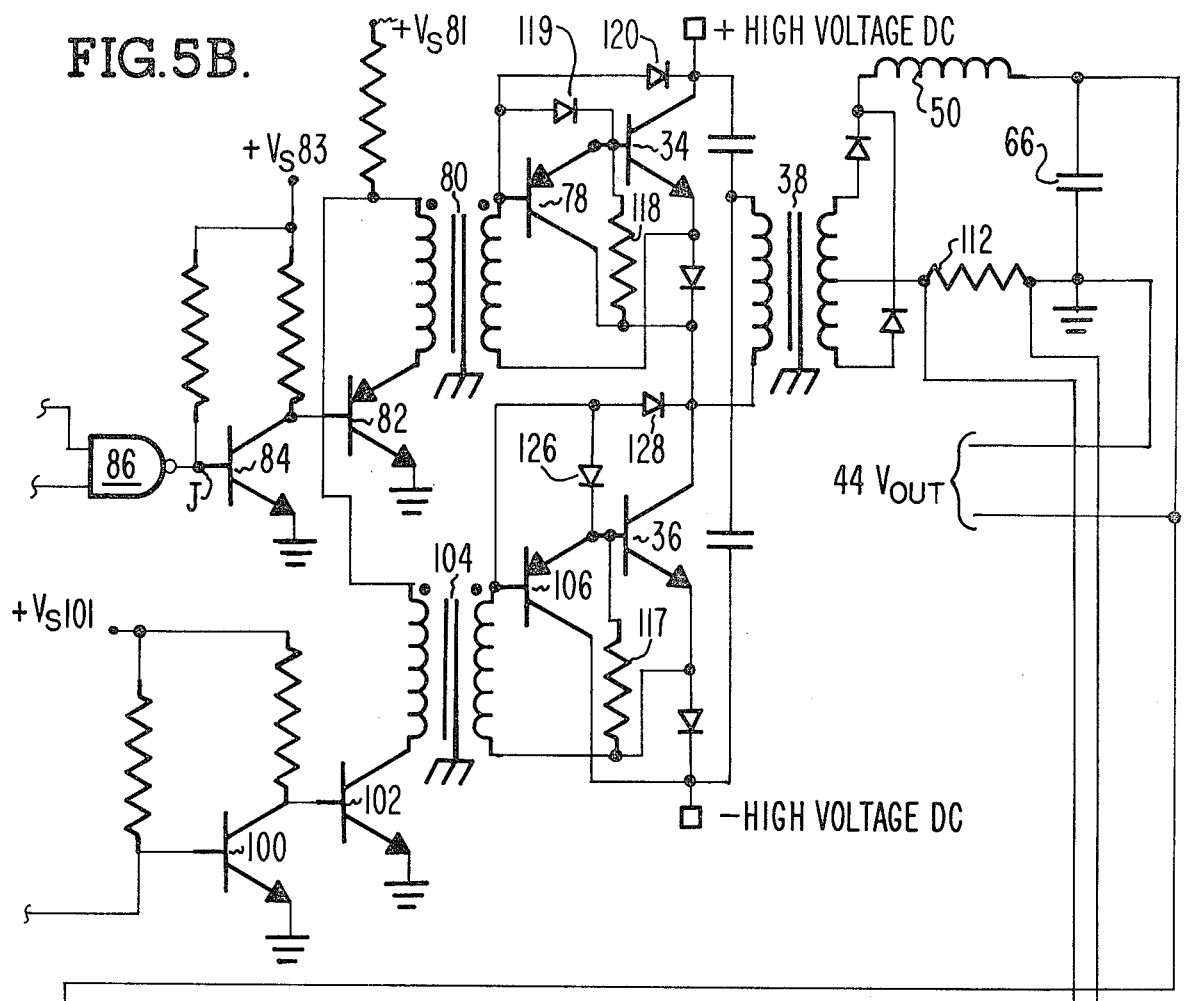

The circuitry of FIGS. 5A and 5B determines the switching frequency and duration of switching cycles in response to varying loads.

In the preferred embodiment of the invention, a 0.64 Mhz oscillator 58 has its output divided by sixteen in counter 62. Selected counter outputs, $Q_3$ and $Q_4$, are gated to furnish output B for use by the control circuit. The terminal count TC15 of counter 62 is halved by flip flop 64 to produce 20 kilohertz outputs C and D while a combination of the outputs from counter 62 and flip flop 64 produces output A.

To determine the duration of the switching cycle (FIG. 4), the output voltage 44 (FIG. 5B) across output capacitor 66 is fed through a feedback circuit. Initially, the output voltage 44 is sensed by operational amplifier 68 (FIG. 5A) and compared with a reference voltage. If the output voltage 44 is greater than the reference, the negative feedback configuration of amplifier 68 will decrease the voltage appearing at the amplifier's output 70. Conversely, if the voltage and current demands of the load decrease and thereby lower the output voltage 44, amplifier 68 will increase the voltage level at output 70.

The voltage increase or decrease appearing at the output of amplifier 68 is transmitted to the positive input of comparator 72 to determine when this voltage equals a ramp of generated voltage fed to the negative input of comparator 72. The voltage ramp (FIG. 6) acts as a linear voltage reference for determining when to switch the positive and negative transistors, 34 and 36 (FIG. 5B) respectively. Consequently, this timed switching controls the duration of the positive and negative portions of the switching cycle, 52 and 54 respectively (FIG. 4), and thereby the amount of voltage delivered to output 44 (FIG. 5B).

Figure 8:
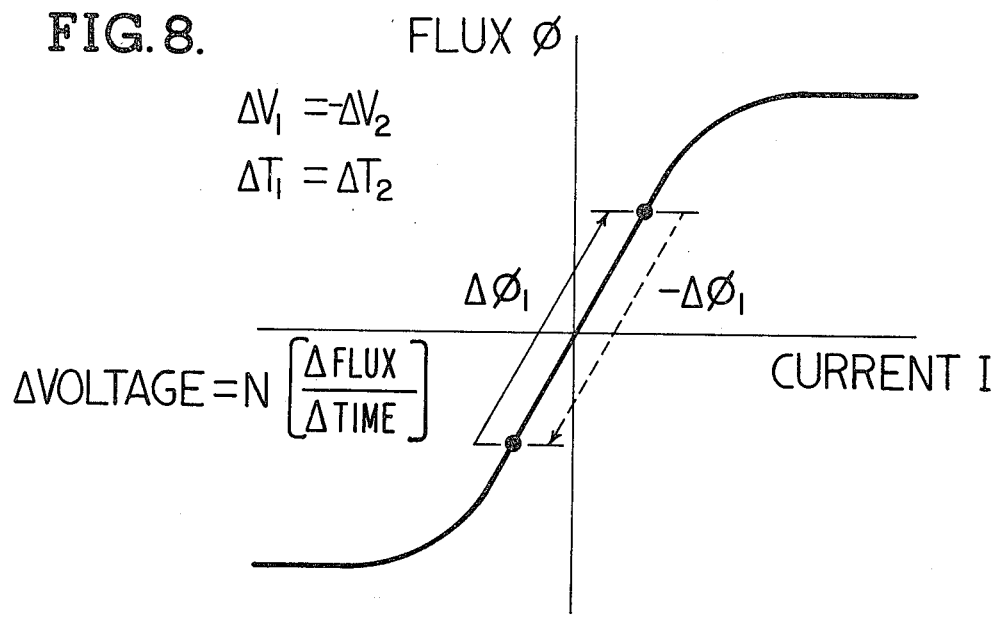
FIG. 8 depicts a representative hysteresis graph for a converter transformer where the positive and negative flux changes are equal.
Figure 9:
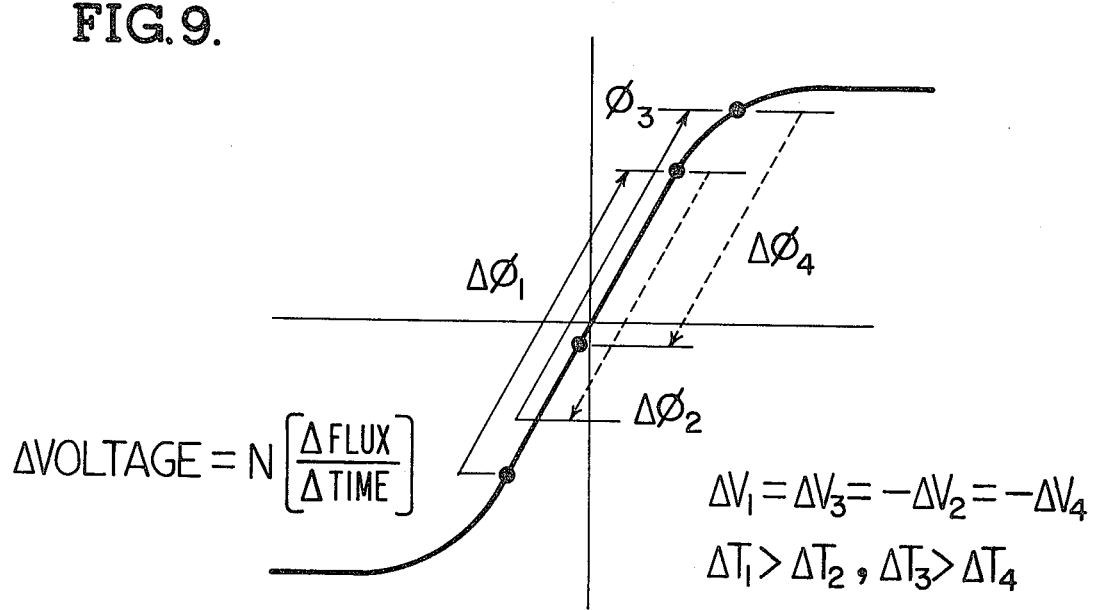
FIG. 9 depicts the climbing hysteresis of a converter transformer which occurs when the time for the positive flux change is greater than the time for the negative flux change.

The challenge has been to precisely equalize the "on" time of positive and negative transistors 34 and 36 so that equal amounts of voltage duration are delivered to output 44 during the switching cycle. The ideal graph (FIG. 8) of the switching shows the flux change generated in the transformers of the circuit when the duration of the positive and negative portions of the switching cycle are equal. However, as shown in FIG. 9, if the positive portion is consistently longer than the negative portion, the flux operating area of the transformer climbs from the linear region to the saturation portion. At that point, additional flux changes cannot occur to produce the required voltage. To compensate, more current is drawn to satisfy the power demands of the load. However, if too much current flows through the transformers, damage is likely.

Figure 6:
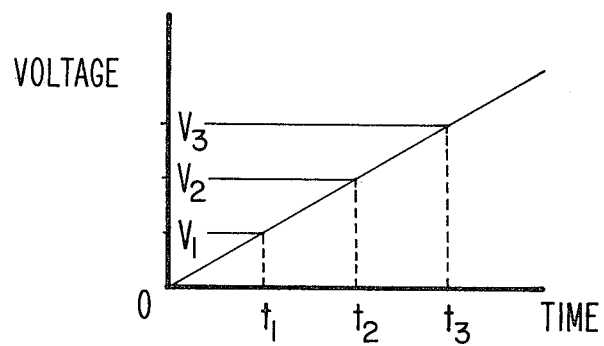
FIG. 6 is a graph depicting voltage level comparisons with a generated voltage ramp reference.
Figure 7:
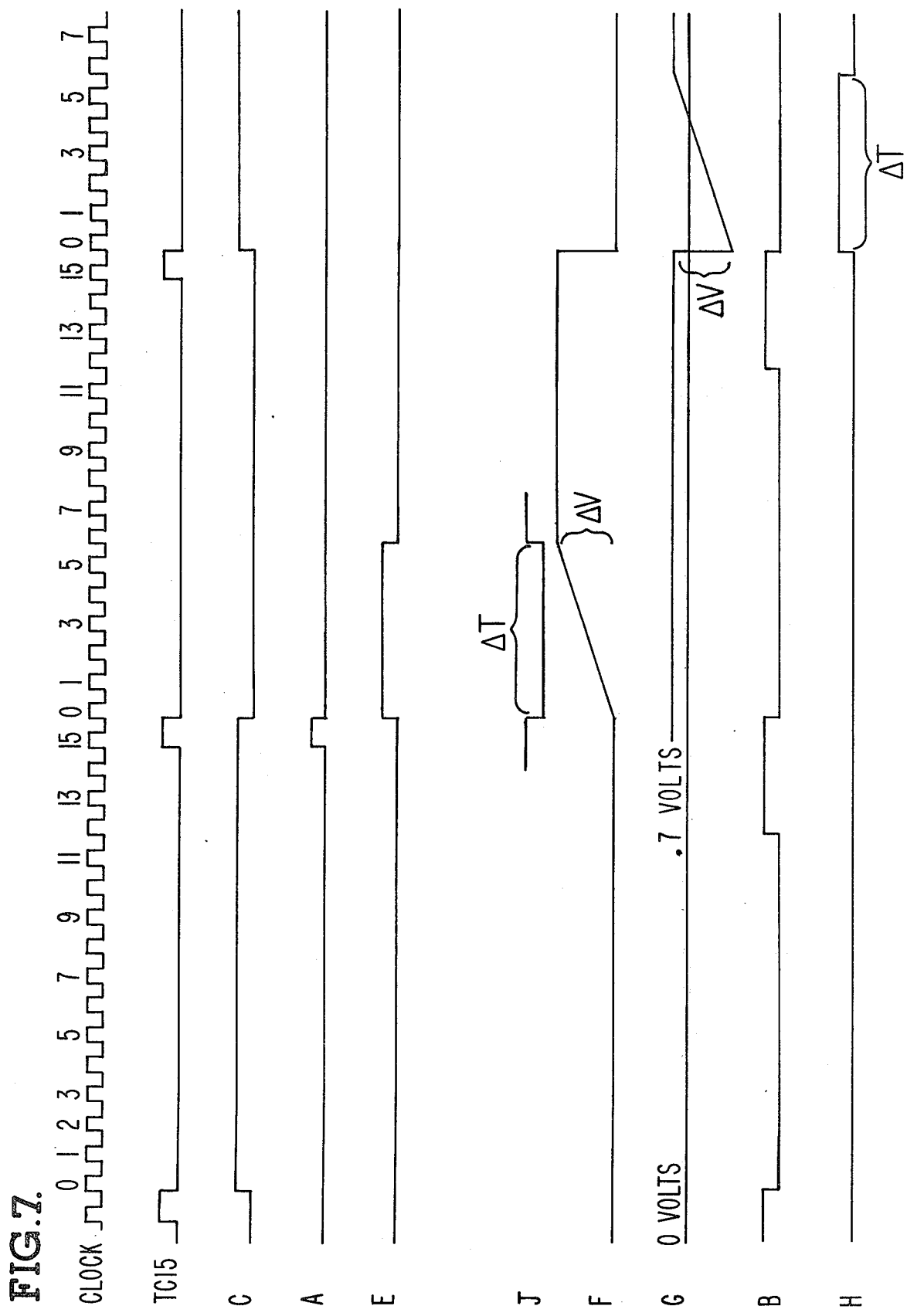
FIG. 7 is a timing diagram illustrating when selected signals occur.

As shown in FIG. 7, the positive and negative portions are started at clock count zero from counter 62 (FIG. 5A). The output E (FIG. 5A) remains at logic level one until comparator 72 resets flip flop 74. The timing for this reset pulse comes from comparing the generated ramp voltage (FIG. 6) with the output of amplifier 68. Generation of this ramp begins when outputs C and E are at logic level zero (zero voltages) so open collector NAND gates 88 and 76 are both turned off and current will not flow into their outputs. As a result, the current supplied by the voltage source 89 will flow through the left and right matched transistors, 90 and 92 respectively, since the same voltage source will supply the transistors' "turn-on" voltage at their bases through zener diode 94. The values of $R_1$ and $R_2$ are chosen to be equal. Therefore, currents through transistors 90 and 92 will also be equal. The current through right transistor 92 will flow through point G, turn on transistor 96, and flow to ground. As a result, the voltage at point H will be nearly zero because of the direct path to ground through transistor 96. This zero value causes the output of open collector NAND gate 98 to be at a level one (turned off) which turns on transistor 100 (FIG. 5B), closes a current path to ground from the fixed voltage source 101, and fails to turn on transistor 102. Consequently, current does not flow from the fixed voltage source through the primary of transformer 104 to induce a voltage at the secondary. Negative transistor 36 remains off as will be later explained.

Considering left transistor 90 (FIG. 5A) in its turned on condition with NAND gates 76 and 88 remaining off, current flows from the fixed voltage source 89 through point F and into ramp capacitor 108. The current charges ramp capacitor 108 as shown in FIG. 6 and this ramp appears at the negative input to comparator 72 for comparison with the output of amplifier 68. When the voltage on ramp capacitor 108 attains the level of the output of amplifier 68, comparator 72 will transmit an output to reset flip flop 74, switch E to level zero, and cause the output of open collector NAND gate 86 (FIG. 5B) to turn on transistor 84. Current from the fixed voltage source 83 will flow through transistor 84 to ground and transistor 82 will turn off so no current flows through the primary of transformer 80. The stored energy in transformer 80 will induce current in the secondary of transformer 80. This induced current turns on transistor 78 which turns off transistor 34 to end the positive portion 52 (FIG. 4) of the switching cycle.

For the negative portion 54 (FIG. 4) of the switching cycle, NAND gate 76 (FIG. 5A) is turned off and NAND gate 88 is switched on. Since the voltage across capacitor 108 cannot change instantaneously, the voltage change at point F is transmitted to point G and turns off transistor 96. Consequently, the voltage at point G will drop below the turned-on 0.7 volts, an amount equal to the voltage change at point F, current will flow from point G into ramp capacitor 108, and the ramp of voltage for this negative portion 54 (FIG. 4) of the switching cycle will duplicate the slope and charge accumulation of the ramp (FIG. 7) for the positive portion 52 (FIG. 4) of the switching cycle since the currents through transistors 90 and 92 are equal. With the same amount of current charging ramp capacitor 108 (FIG. 5A) from point G during the negative portion 54 (FIG. 4) of the switching cycle as from point F (FIG. 5A) during the positive portion 52 (FIG. 4) of the switching cycle, the time required during the negative portion 54 of the switching cycle for the ramp to attain the same voltage change as during the positive portion 52 of the switching cycle will be equal. When the voltage durations are equal, the magnitude of the switched output voltages will likewise be equal.

The discharge of ramp capacitor 108 (FIG. 5A) into NAND gate 88 turns off transistor 96 which turns on NAND gate 98. Consequently, transistor 100 (FIG. 5B) is turned off so that the voltage from the fixed voltage source 101 turns on transistor 102. Current from the fixed voltage source 81 travels to this ground through the primary of transformer 104 and induces current flow in the transformer's secondary to turn on negative transistor 36 for the negative portion 54 (FIG. 4) of the switching cycle.

To provide conventional protection for short circuits and high currents, comparator 114 (FIG. 5A) and amplifier 116 sense the output current flow through resistor 112 (FIG. 5B) and take over control from amplifier 68 under excess current conditions.

Output Transistor-Diode Configuration

During the positive portion 52 (FIG. 4) of the switching cycle, the induced current in the secondary of transformer 80 (FIG. 5B) turns on transistor 34. However, because of the configuration of diodes 119 and 120, the total induced current does not enter the base of transistor 34 (FIG. 5B) to excessively saturate the device. Instead, current is channelled into the base of transistor 34 (FIG. 5B) until the minimum turned-on current level is attained. The remaining current from the secondary of transformer 80 (FIG. 5B) is channelled by diode 120 so that transistor 34 can be quickly turned off. During the negative portion 54 (FIG. 4) of the switching cycle, current paths through diodes 126 and 128 (FIG. 5B) and transistors 106 and 36 similarly turn transistor 36 on.

When current ceases to flow through the primary of transformer 80, the stored energy in the secondary of the transformer results in a current flow opposite in polarity to that of the induced current. The stored current flows through the transformer secondary and turns on transistor 78. Switched on transistor 78 quickly removes the base charge on transistor 34 to turn off transistor 34 with a minimum delay to end the supply of regulated output voltage during the positive portion of the switching cycle. Similar switching of transistors 106 and 36 ends the supply of regulated output voltage during the negative portion of the switching cycle when current ceases to flow through the primary of transformer 104.

What is claimed is:

1. A switched mode regulated DC to DC converter for supplying a regulated voltage to a load comprising:

a switching frequency generator for generating a switching cycle having positive and negative portions;

means, responsive to the output of the switching frequency generator, for accumulating a voltage during the positive and negative portions of the switching cycle;

means for sensing load voltage demand;

means for generating a first and second trigger output during the respective positive and negative portion of the switching cycle when the accumulated voltage equals the sensed load voltage demand, the time required to generate the second trigger output being equal to the time required to generate the first trigger output;

transformer means, coupled to the means for accumulating, for generating currents of positive and negative polarity during the positive and negative portions of the switching cycle;

a load voltage source;

first switching means, responsive to the generated currents of positive polarity, for driving the transformer means during the positive portion of the switching cycle; and second switching means, responsive to the generated currents of negative polarity, for driving the transformer means during the negative portion of the switching cycle;

wherein the means for generating a first and second trigger output during the positive portion of the switching cycle when the accumulated voltage equals the sensed load voltage demand, the time required to generate the second trigger output being equal to the time required to generate the first trigger output comprises:

a supply voltage source;

a pair of matched transistors biased by the supply voltage source;

a capacitor electrically connected to the supply voltage source through the matched transistors to store voltage during the positive and negative portions of the switching cycle, a third transistor, responsive to outputs from the matched transistors, for coupling the capacitor between a first of the matched transistors and ground during the positive portion of the switching cycle, the third transistor coupling the capacitor to a second of the matched transistors during the negative portion of the switching cycle;

means, responsive to the switching frequency generator, for directing current to the capacitor during the positive portion of the switching cycle, the means, responsive to the switching frequency generator, for directing current from the capacitor to ground during the negative portion of the switching cycle;

an operational amplifier to transmit the sensed load voltage demand; and a comparator to compare the stored accumulated voltage on the capacitor and the transmitted portion of the load from the operational amplifier.

* * * * *